(12) United States Patent
Prosi

(10) Patent No.: US 7,327,487 B2
(45) Date of Patent: Feb. 5, 2008

(54) BANDED COMPOSITOR FOR VARIABLE DATA

(75) Inventor: Rainer Friedrich Prosi, Kiel (DE)

(73) Assignee: Eastman Kodak Company, Rochester, NY (US)

( * ) Notice: Subject to any disclaimer, the term of this patent is extended or adjusted under 35 U.S.C. 154(b) by 978 days.

(21) Appl. No.: 10/046,031

(22) Filed: Oct. 23, 2001

(65) Prior Publication Data

US 2003/0076535 A1    Apr. 24, 2003

(51) Int. Cl.
*G06F 15/00*    (2006.01)
(52) U.S. Cl. ............... 358/1.16; 358/1.15; 707/101
(58) Field of Classification Search ............... 358/1.16, 358/1.15; 707/101
See application file for complete search history.

(56) References Cited

U.S. PATENT DOCUMENTS

| | | | | |
|---|---|---|---|---|
| 4,826,333 A | * | 5/1989 | Tanaka | 400/76 |
| 5,104,245 A | * | 4/1992 | Oguri et al. | 400/68 |
| 6,049,390 A | * | 4/2000 | Notredame et al. | 358/1.15 |
| 6,064,397 A | * | 5/2000 | Herregods et al. | 345/630 |
| 6,246,993 B1 | * | 6/2001 | Dreyer et al. | 705/9 |
| 6,330,071 B1 | * | 12/2001 | Vidyanand | 358/1.15 |
| 6,441,919 B1 | * | 8/2002 | Parker et al. | 358/1.18 |
| 6,446,100 B1 | * | 9/2002 | Warmus et al. | 715/517 |
| 6,762,855 B1 | * | 7/2004 | Goldberg et al. | 358/1.5 |

OTHER PUBLICATIONS

Bienz et al., "Portable Document Format Reference Manual", Version 1.2, Adobe Systems Incorporated, Nov. 12, 1996, pp. 1-16, 29-44, 178-186, 211-244, 271-278, 293-314, and 375-380.*

* cited by examiner

*Primary Examiner*—Twyler Lamb
*Assistant Examiner*—Mark R. Milia
(74) *Attorney, Agent, or Firm*—Lawrence P. Kessler

(57) ABSTRACT

A method and apparatus for Variable Data Printing that adds performance requirements to a raster image processor (RIP) memory optimization that employs memory bands within the page composition process. Documents containing both recurring elements as well as non-recurring elements are sorted into element lists depending on their frequency of recurrence and their layering position. The recurring elements are retained in rasterized form, while the non-recurring elements are rasterized as they are used in output memory. One pass assembly in raster image processing of the elements occurs when the recurring elements are blitted into memory and the variable elements are RIPped on the fly.

25 Claims, 3 Drawing Sheets

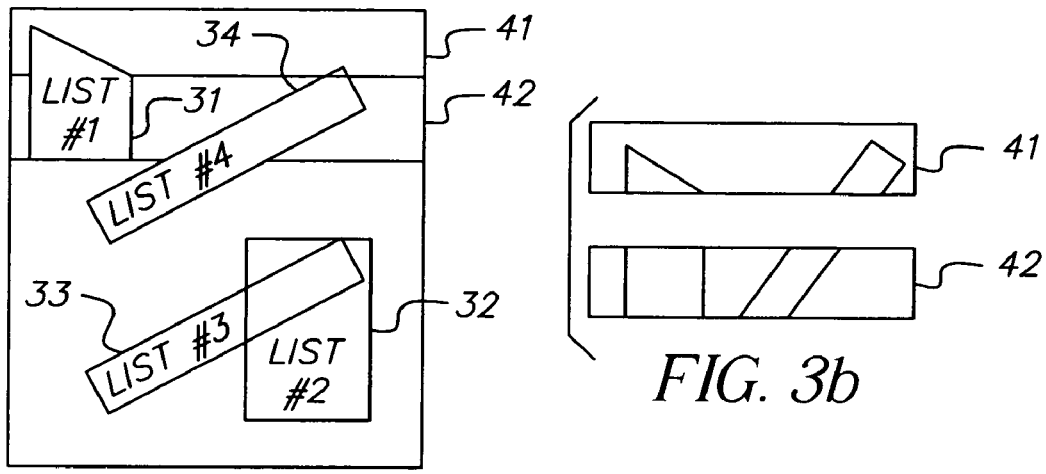
FIG. 3a
FIG. 3b
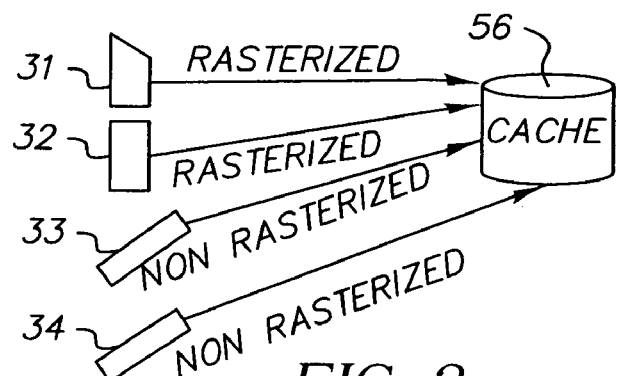
FIG. 3c
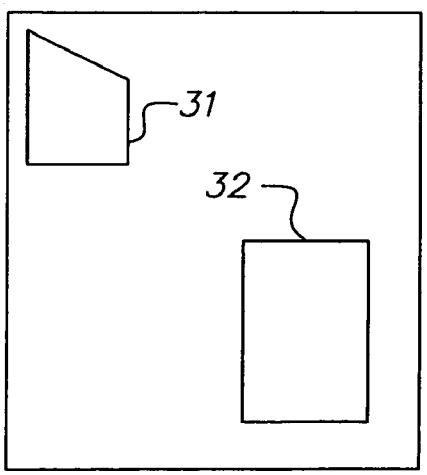
FIG. 3d
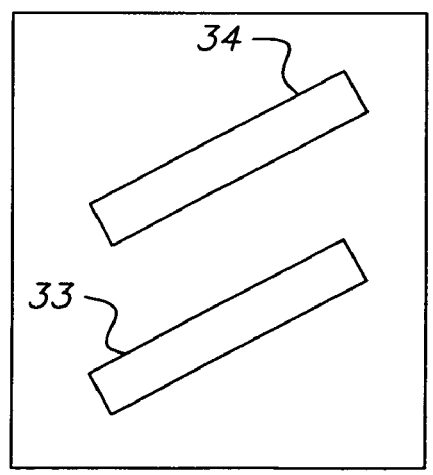
FIG. 3e

BANDED COMPOSITOR FOR VARIABLE DATA

FIELD OF THE INVENTION

The present invention is related to Variable Data Printing (VDP) and more particularly to memory optimization techniques that provide single pass raster image processing in the page composition process.

BACKGROUND OF THE INVENTION

Recent developments in the graphics arts industry has led to the development of Variable Data Printing (VDP) which allows for prints containing personalized data. VDP adds additional performance requirements to a Raster Image Processor (RIP) because the personalized data results in pages that need to be rendered individually.

Variable Data Printing is a modern form of printing that allows highly targeted content and information in an output. VDP combines graphical arts design with information technology to provide the utility to add variable content. Variable content is derived from data in databases that characterize the targeted audience. It is envisioned that the highly customized printed material will enable in the printing industry the success being seen today in Internet one-to-one marketing.

A problem that exists with a variable-data print job is that it will typically take longer to process than a similar, non-variable-data print job. Variable print data conventionally is sent to a Raster Image Processor (RIP) where code for text elements and graphic elements are processed into a format that can be used by the marking engine. Therefore, every page having variable data must have each and every code element RIPped (Raster Image Processed). This presents a substantial processing overhead compared to non-variable-data print jobs where the code for the text elements and graphic elements needed to be RIPped only once.

There is an ongoing desire within the graphic arts community to correct the shortcoming, as discussed above, within the prior art and to enable a faster form of VDP up to final print production and finishing. It is also desirable to use currently practiced methodology within the print engine. The graphic arts community has been in need, until recently, of a method for providing efficient and reliable exchange of variable data digital master data.

A new mark up language for variable data printing based on XML is the Personalized Print Markup Language (PPML) that makes variable-data jobs print faster by allowing a printer to store text elements and graphic elements and re-use them as needed. This eliminates the need to send the same code to the printer/RIP multiple times during the same print job.

PPML is a significant advancement for variable data printing because it allows a printer/RIP to understand at an object level rather than a page level. It allows a printer/RIP to have a certain degree of intelligence and manipulate the components (objects) that make up a page. It also provides code developers the ability to name objects, which permits their re-use as needed during printing of a variable-data job.

A further development that can be used with PPML is a recent standard that has developed called Variable Data Exchange (VDX), which has evolved as a means of producing variable data in the form of a VDX instance. A VDX instance can be looked at as a compilation of records that define the content and layout of many composite pages. These VDX instances can be used with PPML to create composite pages of PPML/VDX instance documents.

VDP adds additional performance requirements to a Raster Image Processor (RIP) because every instance of a document is unique and must be composed individually. In general, documents will contain both recurring elements that may have been prerasterized and also non-recurring elements that must be processed (RIPped) on the fly.

Composition of graphic elements into a sheet surface is traditionally done using a full frame buffer that represents all color separations of the surface. This buffer can become very large for large format, high resolution color images. There are numerous prior art references that deal with memory utilization problems. Prior art reference U.S. Pat. No. 6,134,018 issued to Dziesietnik et al. (Dziesietnik) teaches that variable data can be RIPped more efficiently by RIPping and compressing data simultaneously. Dziesietnik teaches that a system can use less memory (storage) by using compression techniques but the system of Dziesietnik still requires that a frame buffer be used to store the compressed master document. The variable data is then merged with the master document in the frame buffer. While providing some improvements in terms of processing efficiency and memory utilization, Dziesietnik does not provide a significantly efficient method of using recurring objects that obviates the use of a frame buffer.

Another traditional method of utilizing memory involves employing band buffers in a composer and requires all elements to be prerasterized. These elements can be appropriately sorted and placed onto the band buffers. While this method provides the use of memory bands instead of a frame buffer type of memory, the disadvantage of this method is that every element must be prerasterized and subsequently merged onto the band, regardless if the element is recurring or not. This creates an additional processing overhead since even non-recurring elements must first be rasterized into one memory region and subsequently copied into the final band.

Other compositions of graphic elements onto a sheet surface implementations provide simple alternatives by dictating that all objects must be rectangular and allow no overlap of the objects. Another simple version of rendering allows the objects to be layered but does not allow unmarked pixels within the objects, i.e. no pixels within the higher layers may be transparent. In this case the top object can be determined prior to RIPping and the appropriate clip paths may be set for variable objects.

From the foregoing discussion, it should be readily apparent that there remains a need within the art for a method and apparatus that can RIP variable data quickly and efficiently.

SUMMARY OF THE INVENTION

The present invention addresses the aforementioned shortcomings within the prior art. Variable Data Printing adds performance requirements to a raster image processor (RIP) because every instance of a document is unique and must be composed individually. The present invention details a method and apparatus of memory optimization that employs memory bands within the page composition process. Documents containing both recurring elements as well as non-recurring elements are sorted into element lists depending on their frequency of recurrence and their layering position. The recurring elements are retained in rasterized form, while the non-recurring elements are rasterized as they are used in output memory.

These and other objects of the invention are provided by a method and apparatus for one pass assembly in raster image processing of elements using a memory element by: forming a plurality of lists from elements within a job file including at least a first list for recurring elements and storing the first list in rasterized form, and at least a second list for variable elements and storing the second list in non-rasterized form; identifying placement within at least one memory area of recurring and variable elements; initializing the least one memory area with stored elements from the first list; and Raster Image Processing (RIPping) the memory area with elements from the second list.

The RIP may run in banded mode, which requires much less memory than a full frame buffer, enabling variable print optimization both on low-end systems and on systems with high output resolution. The majority of recurring elements can be intercepted prior to RIPping the variable page and merged with the variable page in a raster mode. Arbitrary layering of variable and recurring elements is supported.

BRIEF DESCRIPTION OF THE DRAWINGS

FIGS. 3a-3e are a graphical depiction of the rendering of a page using the present invention.

DETAILED DESCRIPTION OF THE INVENTION

Variable Data Printing (VDP) adds performance requirements to a raster image processor (RIP) because every instance of a document is unique and must be composed individually. The present invention details a method and apparatus of memory optimization that employs memory bands within the page composition process. In general, documents used in variable data printing will contain both recurring elements that have been previously rasterized as well as non-recurring elements that should be raster image processed (RIPped) on the fly. The present invention sorts elements into lists depending on their frequency of recurrence and their layering position.

Pages of a personalized document employed in variable data printing as envisioned by the present invention are described in a markup context that includes meta-data about the individual elements, such as XML. The meta-data contains information on recurrence frequency, size, position and orientation of the respective element. Element layering is defined by the order of element occurrence in the markup file, i.e., earlier objects are below later objects in the markup file. Therefore, the background of an image is typically the earliest object within the markup file. The individual elements are described in a page description language, i.e., PDF, Adobe Postscript, etc. Accordingly, files that are used within variable data printing to render a page as envisioned by the present invention will contain both meta-data and page description language.

Figure 1:
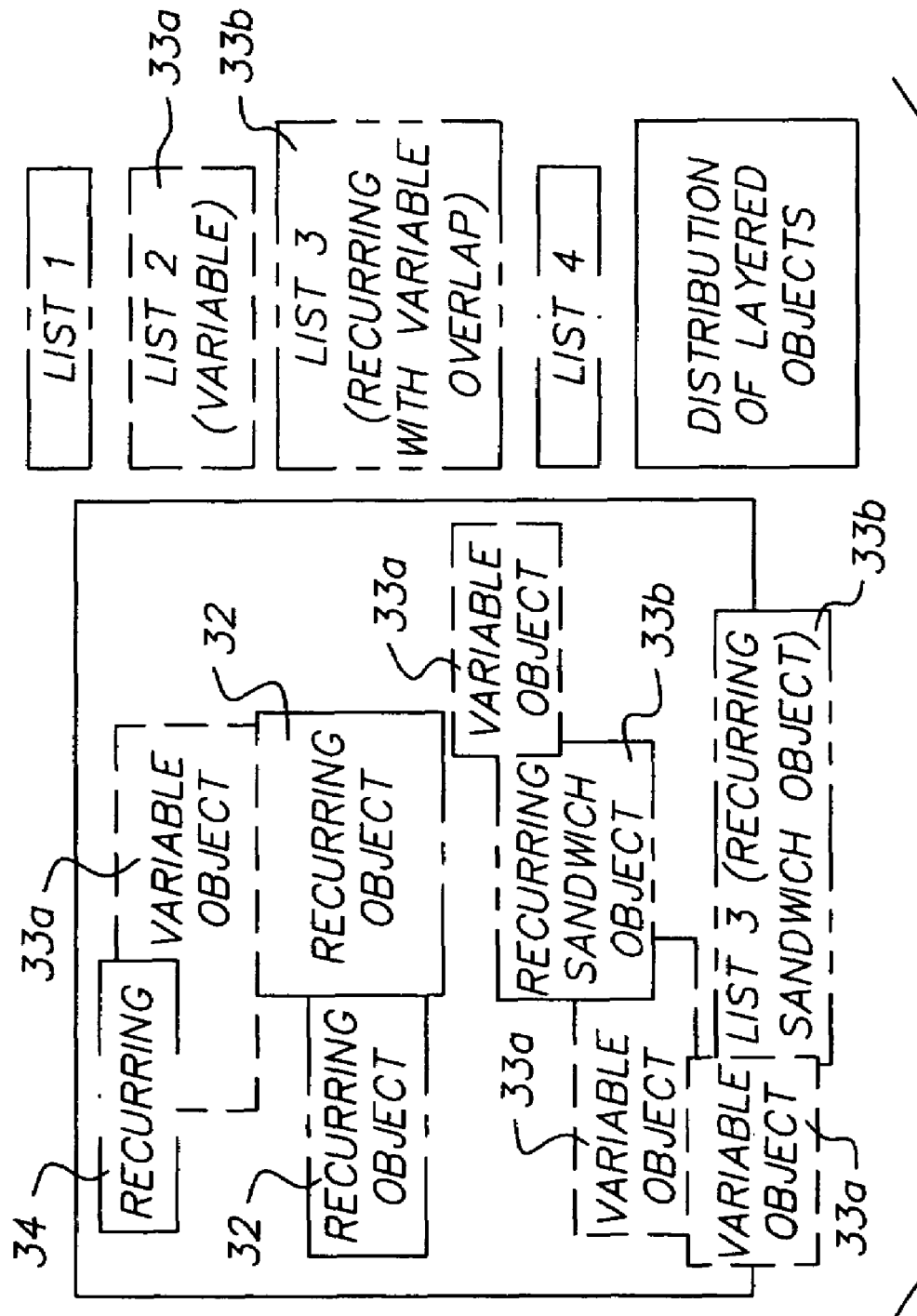
FIG. 1 is a graphical illustration of the lists of categories that the present invention divides the elements into in order to render a page that is to be printed.

The present invention reads the meta-data within the file and sorts the individual graphic elements that describe a page into different categories. FIG. 1 is a graphical illustration of the lists of categories that the present invention divides the elements into in order to render a page that is to be printed. The preferred embodiment of the present invention employs four different element lists. The first list (List#1 objects 31) is a list of recurring elements that are not in the cache and must be prerasterized and stored in the rasterized element pool. The objects from List#2, generally referred to as List#2 objects 32, are objects that recur and do not have any non-recurring objects (no variable data) below them. These List#2 objects 32 are RIPped and stored in the rasterized element pool (typically a cache) where the system can blit them into the desired areas of the memory bands. The term "blit" as used herein is refers to a process whereby a large array of bits is copied from one part of a computer's memory to another. The elements from the List#1 objects 31, are recurring objects that need to be RIPped and placed into the cache. These recurring List#1 objects 31 that are RIPped and stored in the cache are then treated the same as List#2 objects 32. Accordingly, after List#1 objects 31 have been RIPped, the system can blit the List#1 objects 31 into the memory bands. A complete page background would also be an element in the second list and would comprise one or several List#2 objects 32.

Still referring to FIG. 1, there are two types of objects that can be placed into the third list and need to be raster image processed (RIPped) on the fly. This third list contains non-recurring elements and also elements that are recurring and cached but have non-recurring elements both beneath and on top of them. The elements having non-recurring elements above and below are generally referred to as "sandwich faults". These two types of objects (non-recurring elements and sandwich faults) are the variable objects that must be RIPped on the fly. These non-recurring elements are generally referred to herein as List#3a objects 33a and the recurring objects that have variable objects both above and beneath them (sandwich faults) are generally referred to as List #3b objects 33b. The variable data objects that comprise List#3a objects 33a, or personalized data, are not prerasterized because of their very nature and will always require RIPping on the fly while the page is being printed. The recurring objects that comprise List#3b objects 33b are those that may have been rasterized but can not be taken out of the cache because they exist between variable data objects (sandwich faults). Theses sandwich faults also need to be RIPped on the fly and therefore are placed in the same category as variable data.

Within the preferred embodiment of the invention, a fourth list of prerasterized elements that do not have any non-recurring elements layered on top of them is created. The elements within the fourth list, generally referred to herein as List#4 objects 34, are those recurring objects that have variable data objects beneath them. This may contain elements from the List#1 objects 31. The List#1 objects 31 are already rasterized and preferably in the cache. It should be noted, however, that the variable objects beneath the List#4 objects 34 need to be placed into the memory bands before the List#4 objects 34 that are going to be placed on top of them.

Figure 2:
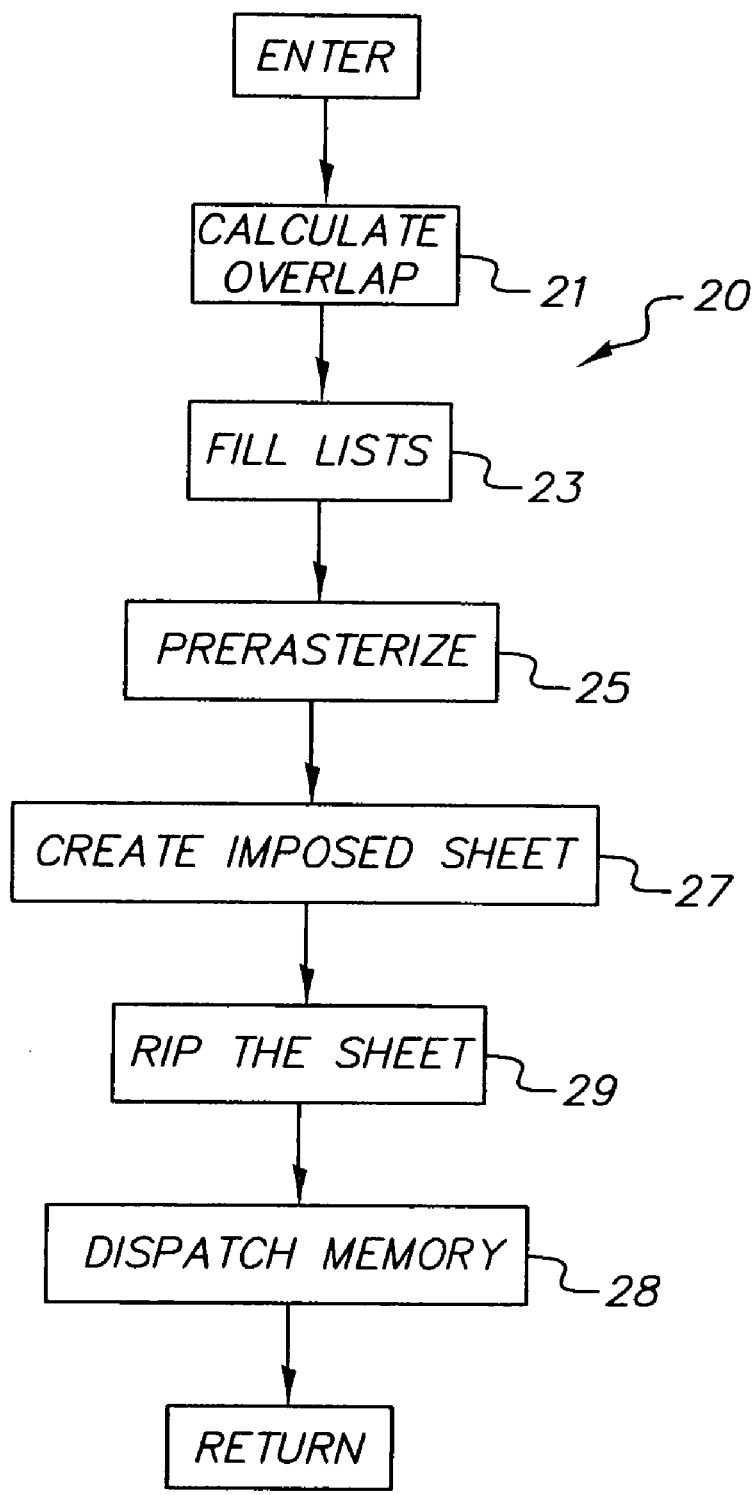
FIG. 2 is a flow diagram of a global processing loop illustrating the basic process steps involved in the rendering of a single sheet.

FIG. 2 is a high level flow diagram, -or a global processing loop, illustrating the basic process steps involved in the rendering of a single sheet as envisioned by the preferred embodiment of the present invention.

Calculate Overlap 21 interprets all the elements within a page in accordance with the meta-data from the markup portion of the document file to calculate the amount of overlap between the elements. Preferably, the overlap is only calculated if the result can potentially influence the list into which that element will potentially be placed. If two objects are both variable (members of List#3) their mutual overlap will not influence the choice of list. The overlap of recurring and variable elements is determined using the clip regions defined in the meta-data of the markup file. These clip regions can be either a bounding rectangle or a more complex outer path. Fill Lists 23 creates List#1 through List#4 according to the meta-data in the markup file and the calculated overlap. Fill Lists 23 will itemize the recurring objects that have variable objects both above and below these objects which are then moved to the list of variable elements. This should happen very rarely in a production scenario with well-designed templates.

Prerasterize 25 performs a program loop over all elements in List#1 and rasterizes them into the recurring element pool within the cache. These elements in List#1 are the recurring elements that have not yet been placed into the rasterized element pool. The recurring List#1 elements that have not been placed in the prerasterized element pool are rasterized and stored in the cache. This step may be completed before the actual print run starts in order to enhance processing speed at the cost of a longer start-up phase. In another implementation, an intelligent raster pool manager may optimize space usage by deleting elements that are no longer required.

Create imposed sheet 27 renders a single sheet that comprises the imposed objects from List#3 as detailed within the page description language used to describe the individual elements in the document file. The variable elements in list 3 are combined into one printable page in the primary page definition language of the RIP, i.e., Postscript/PDF. Placement of the elements is resolved in the context of the PDL using native PDL mechanisms, i.e., transformation matrices. The sheet is rasterized in the same manner as a "normal" sheet.

Rip the sheet 29 takes the imposed sheet as specified from List#3 in banded mode. For each band, this requires the following steps to be performed: The memory band is preset with elements from List#2 and a new band must be initialized. If no elements from List#2 are positioned on a specific pixel, it is set to white, or else the element from List#2 is placed onto the band. It should be understood, that this can be enhanced by various types of hardware such as dedicated processors with embedded firmware, or specifically designed processor, as well as by software alone. The appropriate memory band from List#3 is RIPped from the imposed sheet defined in List #3. The appropriate elements from List #4 are then merged into the memory band.

Dispatch the memory 28 takes the data arranged in the memory band and dispatches it to a print engine. After a band is completely RIPped, the elements from List #4 are copied opaquely onto the band at their respective positions. This may be enhanced by hardware. The band is now finalized and can be dispatched to the engine. In a preferred implementation, multiple bands will exist that can be dispatched and filled in a pipeline or ping-pong mode.

The above steps of Calculate Overlap, Fill all Lists, and Prerasterize can be performed in a pipelined fashion.

An illustration of the page rendering process as envisioned by the present invention is graphically shown in FIGS. 3a-3f as previously described in FIGS. 1 and 2 in terms of the memory allocation and page rendering.

FIG. 3a illustrates a single page 30 as it is intended to look after it has been rendered. List#1 objects 31 represent the items that will be placed into List#1, as previously stated constitute recurring elements that have not been placed into the cache and still must be prerasterized and stored in the rasterized element pool. List#2 objects 32 represent the items that will be placed into List#2 comprising prerasterized elements that do not have any non-recurring elements layered beneath them. List#2 objects 32 are already stored in the raster pool, which within the preferred embodiment is a cache. List#3a and List#3b objects (33a and 33b) are those elements that need to be raster image processed (RIPped) on the fly either because they are non-recurring elements or they are recurring elements having non-recurring elements both beneath and on top of them, "sandwich faults." The List#4 objects 34 are those having non-recurring elements layered on top of them, which may contain elements from List#1.

FIG. 3b is an illustration of the two memory bands 41, 42 that are employed by the preferred embodiment of the present invention. The bands as envisioned by the present invention are generic bands as used in any common RIP. The actual number of lines within a band as envisioned by the invention is subject to performance tuning, or hardware considerations and the like. The maximum size of a band is envisioned to be ½ page; otherwise the bands would become a frame buffer. The minimum size of a band is one pixel. Although in practice, the typical size of a band as envisioned by the preferred embodiment of the present invention will be a given amount of data, such as 512 lines of the complete page scan line width. It should be noted that the bands may also be tiles, i.e., that the bands are in no way forced by this invention to span the complete scan line width.

The present invention employs bands 41, 42 as a means of providing an efficient use of memory resources compared with full frame buffers known within the prior art. The use of memory bands is not new to the art of computerized graphics. However, the manner in which the present invention ping-pongs bands 41, 42 is a novel concept that will be discussed below and is a unique form of ping-ponging memory devices that is not suggested by the prior art.

FIG. 3c illustrates the present invention initially interpreting the job file to the Calculate Overlap 21 in the objects that are contained in the job file. The overlap of recurring and variable elements is calculated using the clip regions defined in the meta-data of the markup file. Overlap is only calculated if the result may influence the choice of list for the element.

As envisioned by the present invention, an example of the overlap influencing the choice of a list is in the case of a "sandwich fault", which is when a recurring object has variable data above and below it. An example of an overlap that will not influence the choice of a list is where a "sandwich fault" must be reripped after it is farther overlapped by additional objects.

Fill Elements List 23, as previously described, uses the results from the Calculate Overlap 21 to complete the four lists as previously defined. The Fill Element List 23 is performed in conjunction with filling the cache 50 and redefining elements in accordance with the results of the Calculate Overlap 21 function. Recurring objects that have been previously defined as List#2 objects 32, may already have been RIPped but have variable objects both above and below them, are then moved to be associated with the List#3b objects 33b and will be treated as variable elements. This should happen very rarely in a production scenario with well-designed templates. Calculated Overlap 21 identifies each junction between overlapping elements and assists in the presetting of the memory bands 41, 42 and filling the memory bands with data.

Prerasterize 25 operates on recurring elements that are not in the rasterized element pool. These recurring elements that have not yet been placed into the prerasterized element pool are therefore, rasterized and stored in the cache 50. This step may be completed before the actual print run starts in order to enhance processing speed at the cost of a longer start-up phase.

An alternative embodiment can, in another implementation, provide an intelligent raster pool manager that performs essentially the opposite function of prerasterize 25 and will optimize space within cache 50 by deleting elements that are no longer required.

Referring to FIGS. 3*d* and 3*e*, create an imposed sheet 27 takes the elements on all four lists and partially renders them in memory. FIG. 3*d* identifies the List#1 objects 31 and the List#2 objects 32, and outlines their placement in memory. A partial rendering as used herein refers to a rendering of essentially an outline of the elements and identifying where the overlaps with other objects exist. By the system knowing where the overlaps exist within the various elements, the intersections of the overlaps can be arranged within the memory bands 41, 42 with an associate TAG that identifies which element is to be inserted into the memory band at that intersection. The List#2 objects 32 can be blited from the cache into the memory bands 41, 42 to preset the memory bands. The variable data from the List#3*a* and List#3*b* objects (33*a*, 33*b*) are then partially rendered (FIG. 3*e*). The net result is a combination into one printable page in the primary page definition language of the RIP, i.e., Postscript/PDF. Placement of the elements is resolved in the context of the PDL using native PDL mechanisms, such as transformation matrices. The sheet is rasterized in the same manner as a "normal" sheet not having variable data.

Still referring to FIGS. 3*a*-3*e*, in order to Raster Image Process (RIP) the entire sheet that is to be rendered, the memory band 41, 42 are preset using the List#2 objects 32 from the cache 50. These List#2 object 32 have already been RIPped and can simply be blited into the memory bands. One of the memory bands 41, 42 will be initialized while the other band is being read. The initialization process involves taking elements from List#2 objects 32 within cache 50 and positioning them on a pixel, if there are no List#2 objects that are to be positioned on a given pixel, then that pixel is set to white. This may be enhanced by hardware as will be readily apparent to those skilled in the art. The hardware that generally would be used to enhance the RIP function is, generally, any hardware that will assist in fast setting or moving of memory or that assists in decompression of compressed data, such as JPEG compression, can be used. The elements representing variable data are accessed from List#3, which includes both the List#3*a* and List#3*b* objects 33*a*, 33*b* and the entire band is then RIPped from the imposed sheet defined in List#3. The elements from the List#4 objects 34 are merged with a RIPped band after the band is completely RIPped by copying the elements from the List#4 objects 34 opaquely onto the band at their respective positions.

The band that was being initialized is now ready to have its contents dispatched to memory. The invention envisions using multiple memory bands allowing one band containing RIPped data to be read out to the print engine while another is being prepared as described above. In the preferred embodiment two memory bands 41, 42 are employed in essentially a ping-pong type of architecture. Other implementations using multiple bands will fill the bands in a pipeline type fashion.

The foregoing discussion describes the best mode for practicing the present invention. Variations of the best mode previously described will be readily apparent to those skilled in the art. One of these such variations can be using output tiles instead of output memory bands 41, 42. Additionally, the clip region can be non-rectangular. Also, the recurring elements can be prerasterized in a preset stage and save the processing overhead otherwise required to create List#1.

The non-recurring elements in List#3 could be in varied formats, such as TIFF, OPI etc., allowing versatility in the RIP of List #3. As envisioned by the present invention, the software capabilities that the RIP is capable of processing are those that should be employed.

Additional features are envisioned by the present invention. One such additional feature is the use of image masks on the recurring images to allow for transparency. To make an image masks, a method is employed for selectively copying parts of prerasterized data as a mask forming image masks. This may affect performance, so a faster processor, or hardware support, is desirable to make up for the additional processing overhead required to make image masks.

Another feature envisioned is the RIPping of elements from List#1 on distributed computers. As envisioned; this distributed RIPping would be performed on the digital front end. Also, distributed RIPping could be performed on multiple computers or processors.

It is specifically envisioned that the storing of the rasterized version of recurring elements can be done in either a lossy or losslessly compressed mode. The present invention, also, specifically, stores the rasterized version of elements after RIPping and does not make any attempt at RIPping and compressing simultaneously. RIPping the variable data and compressing the variable data with the recurring data simultaneously as taught within U.S. Pat. No. 6,134,018, could potentially be beneficial; however, it is not the preferred method by the present invention. The present invention prefers to RIP completely and compress afterwards.

Allowing for elements in "raster-equivalent graphics" states to be reused, i.e., rotated by 90° or 180°. The system rotates to create the "raster-equivalent graphics" by way of transformation that is applied while copying from the prerasterized cache areas to the memory bands.

The present invention envisions pipelining the list processing over multiple CPUs within the RIP. The following processes may be performed independently on consecutive bands.

Prerasterize recurring objects
Preset bands with elements from List#2
RIP from List#3
Apply elements from List#4

It is further envisioned by the present invention that hardware enhancements of the presetting and merging process (List#2 and List#4) could be accomplished generally by any hardware that assists in fast setting or moving of memory or that assists in decompression of compressed data such as JPEG.

The invention has been described in detail with particular reference to certain preferred embodiments thereof, but it will be understood that variations and modifications can be effected within the spirit and scope of the invention.

PARTS LIST

21 Calculate Overlap
23 Fill lists
25 Prerasterize
27 Create imposed sheet
31 List#1 Object
32 List#2 Object
33*a* List#3*a* Object
33*b* List#3*b* Object
34 List#4 Object
41 memory bands
42 memory bands
50 cache

What is claimed is:

1. A method for one pass assembly in raster image processing of image elements using memory, the method comprising the steps of:
forming a plurality of lists from image elements within a job file, the plurality of lists including a first list of recurring image elements that do not have any variable image elements below them on a stack of image layers and a second list of variable image elements that are not recurring and recurring image elements that have variable image elements both above and below them on a stack of image layers;
storing the elements of the first list in rasterized form;
storing the elements of the second list in non-rasterized from;
identifying placement within at least one memory area of the recurring image elements and the variable image elements;
initializing the at least one memory area with the stored elements from the first list; and
then, raster image processing the at least one memory area with the stored elements from the second list.

2. The method of claim 1, wherein the forming of the plurality of lists includes forming a list of recurring elements having one or more variable elements below and no variable elements above in the stack of image layers to provide an additional list; and the method further comprises:
rasterizing and then storing the elements of the additional list; and placing the stored, rasterized elements of the additional list in the at least one memory area after the step of raster image processing.

3. The method of claim 2, wherein the step of placing further comprises opaquely placing the elements of the additional list in the at least one memory area.

4. The method of claim 2, further comprising the step of storing the recurring elements in a raster-equivalent graphics state and rotating one or more of said recurring elements.

5. The method of claim 1, wherein the step of identifying further comprises locating overlapping areas between image elements.

6. The method of claim 5, wherein the step of identifying further comprises identifying non-rectangular overlapping areas.

7. The method of claim 5, wherein the step of identifying further comprises employing information from the job file to locate overlapping areas between image elements.

8. The method of claim 7, wherein the step of raster image processing further comprises raster image processing image elements from the second list into the at least one memory area in accordance with overlapping areas designated by the identifying step and image element placement within the job file.

9. The method of claim 1, further comprising the step of interpreting mark up language and page description language with the job file.

10. The method of claim 1, wherein at least some of the image elements contain transparent pixels.

11. The method of claim 1, wherein the step of raster image processing further comprises raster image processing image elements on distributed computers.

12. A method for assembly in raster image processing of elements using memory, the method comprising the steps of:
forming a plurality of lists from recurring elements and non-recurring variable elements within a job file, said elements defining a stack of image layers, said lists including a list of ones of said recurring elements having no variable elements below in said stack to provide a recurring element-no-variable-below list, and a list of said variable elements and ones of said recurring elements having ones of said variable elements both above and below in said stack to provide a combined variable and recurring element list;
rasterizing and then storing said elements of said recurring element-no-variable-below list;
storing said elements of said combined variable and recurring element list in non-rasterized form;
initializing a least one memory area with said stored, rasterized elements of said recurring element-no-variable-below list; and
raster image processing said at least one memory area with said elements of said combined variable and recurring element list following said initializing.

13. The method of claim 12 wherein said forming of said plurality of lists includes forming a list of ones of said recurring elements having one or more variable elements below and no variable elements above in said stack to provide a recurring element-variable-below-no-variable-above list; and said method further comprises:
rasterizing and then storing said elements of said recurring element-variable-below-no-variable-above list; and
placing said stored, rasterized elements of said recurring element-variable-below-no-variable-above list in said at least one memory area following said raster image processing.

14. The method of claim 13 wherein said at least one memory area is one of a plurality of memory bands or memory tiles and said method further comprises dispatching said memory bands or memory tiles to a print engine following said placing.

15. The method of claim 14 wherein said rasterizing and raster image processing completely raster image processes said memory area and said placing opaquely copies said stored, rasterized elements of said recurring element-variable-below-no-variable-above list in said memory area.

16. The method of claim 13 wherein said rasterizing further comprises rasterizing and then storing all of said recurring elements prior to said forming.

17. The method of claim 16 further comprising deleting ones of said rasterized and stored recurring elements that are not needed.

18. The method of claim 16 wherein said rasterizing is distributed among a plurality of different computers or processors.

19. The method of claim 12 wherein said rasterizing further comprises rasterizing and then storing all of said recurring elements prior to said forming.

20. The system of claim 19, wherein the processing means identifies overlapping areas between image elements contained within the pre-authored job file.

21. A raster image processing system comprising:
a print engine that receives digital data to create prints;
an input area receiving a pre-authored job file;
a storage system including first and second memory areas;
a processing means coupled to the print engine, the storage system, and the memory areas, forming and storing a plurality of lists from image elements within the pre-authored job file, the plurality of lists including a list of ones of said recurring elements having no variable elements above in said stack to provide a recurring element-no-variable-below list stored in rasterized form in the first memory area, and a list of said variable elements and ones of said recurring elements having ones of said variable elements both above and below in said stack to provide a combined variable and recurring element list stored in non-rasterized form in the second memory area;

a third memory area within the storage system, the third memory area being initialized with said stored, rasterized elements of said recurring element-no-variable-below list and raster image processed with said elements of said combined variable and recurring element list, wherein placement of the image elements in the third memory area is arranged in accordance with image element placement within the pre-authored job file; and a memory output device that allows contents of the rasterized third memory area to be output to the print engine.

22. The system of claim 21 wherein said plurality of lists includes a list of ones of said recurring elements having one or more variable elements below and no variable elements above in said stack to provide a recurring element-variable-below-no-variable-above list stored in rasterized form in the first memory area; and said a third memory area has said stored, rasterized elements of said recurring element-variable-below-no-variable-above list opaquely placed on said initialized and raster image processed elements.

23. The system of claim 22 wherein said at least third memory area is one of a plurality of memory bands or memory tiles and said method further comprises dispatching said memory bands or memory tiles to a print engine following said placing.

24. The system of claim 22 further comprising a plurality of computers or processors prerasterizing said recurring elements.

25. The system of claim 22, wherein one of the memory bands is being initialized and raster image processed with data from the pre-authored job file while another memory band is having its contents sent to the print engine by the memory output device.

* * * * *